US008274461B2

(12) United States Patent
Ha et al.

(10) Patent No.: US 8,274,461 B2
(45) Date of Patent: Sep. 25, 2012

(54) APPARATUS AND METHOD FOR DRIVING LIQUID CRYSTAL DISPLAY

(75) Inventors: Tae-hyeun Ha, Suwon-si (KR); Sergey Shestak, Suwon-si (KR); Dae-sik Kim, Suwon-si (KR); Sung-yong Jung, Suwon-si (KR); Jae-phil Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1129 days.

(21) Appl. No.: 11/760,825

(22) Filed: Jun. 11, 2007

(65) Prior Publication Data

US 2007/0285366 A1 Dec. 13, 2007

(30) Foreign Application Priority Data

Jun. 13, 2006 (KR) ........................ 10-2006-0053117

(51) Int. Cl.
*G09G 3/36* (2006.01)
*G09G 5/00* (2006.01)
*G06F 3/033* (2006.01)

(52) U.S. Cl. ............................. 345/89; 345/87; 345/204

(58) Field of Classification Search ............ 345/87–104, 345/204–215, 690–699; 348/790–794
See application file for complete search history.

(56) References Cited

U.S. PATENT DOCUMENTS

2004/0125064 A1* 7/2004 Adachi et al. .................. 345/89
2004/0196274 A1* 10/2004 Song et al. .................... 345/204
2005/0001802 A1* 1/2005 Lee ................................ 345/89
2005/0083353 A1* 4/2005 Maruyama et al. ........... 345/690
2005/0093803 A1* 5/2005 Cheon et al. .................... 345/92
2005/0231492 A1* 10/2005 Shen et al. .................... 345/204
2006/0022926 A1* 2/2006 Mizumaki et al. .............. 345/89
2006/0066601 A1* 3/2006 Kothari et al. ................ 345/204
2008/0211755 A1 9/2008 Song et al.

FOREIGN PATENT DOCUMENTS

KR 10-2004-0087426 A 10/2004

OTHER PUBLICATIONS

Office Action issued May 9, 2012 by the Korean Intellectual Property Office in counterpart Korean Application No. 10-2006-0053117.

* cited by examiner

*Primary Examiner* — Alexander Eisen
*Assistant Examiner* — Patrick F Marinelli
(74) *Attorney, Agent, or Firm* — Sughrue Mion, PLLC

(57) ABSTRACT

An apparatus and method for driving a liquid crystal display to improve the quality of moving pictures are provided. The apparatus includes a transition check unit that determines whether an input image signal between a first frame and a second frame has changed and whether an input image signal between the second frame and a third frame has changed; an overdrive control unit that overdrives the input image signal in the second frame in an overdrive direction if the transition check unit determines that the input image signal between the first and second frames has changed, wherein the overdrive direction is one of an upper direction and lower direction; and an overdrive compensation unit that changes the input image signal in the third frame in an opposite direction to the overdrive direction if the transition check unit determines that the input image signal between the second and third frames has not changed.

13 Claims, 8 Drawing Sheets

APPARATUS AND METHOD FOR DRIVING LIQUID CRYSTAL DISPLAY

CROSS REFERENCE TO RELATED PATENT APPLICATION

This application claims priority from Korean Patent Application No. 10-2006-0053117, filed on Jun. 13, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a display apparatus, and more particularly, to driving a liquid crystal display to improve the quality of moving pictures.

2. Description of the Related Art

FIG. 1A shows a graph illustrating response values with respect to different drive voltages in a related art liquid crystal display (LCD) and FIG. 1B shows a graph illustrating response values with respect to an overdrive voltage in the related art LCD.

Because drive voltages and response values have difference units, they are first normalized and then plotted as illustrated in FIGS. 1A and 1B. FIG. 1A illustrates an output luminance value of LCD pixels when two different drive voltages are applied to the LCD. A response value is an output luminance value of the LCD panel. Generally, a drive voltage is a voltage corresponding to a video or image signal and is applied to the LCD. On the other hand, an image signal and a drive voltage in the present invention respectively denote an image signal and a drive voltage corresponding to each pixel of a frame.

Referring to FIG. 1A, a response value reaches a target response value after a drive voltage changes and three frames have passed. Accordingly, when a response speed of a pixel in the LCD is slow, an artifact, such as a ghost image or an edge-blurred image, occurs in a moving picture having many movements.

In FIG. 1A, a slope of the response value is higher when the drive voltage is higher, as shown by drive voltages 1 and 2. Accordingly, to accelerate the response speed, an overdrive voltage is used.

FIG. 1B illustrates an output luminance value of LCD pixels when an overdrive voltage is applied to the LCD. When the overdrive voltage is applied in a frame period, for example, frame 2, the LCD response speed increases in the corresponding frame period. When the overdrive voltage changes to an ordinary drive voltage at frame 3, an output response value maintains the target response value. Accordingly, when the overdrive voltage is applied in a frame period, the response speed can be increased. However, a phenomenon, such as edge-blur cannot be completely removed only by applying the overdrive voltage to the LCD.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for driving a liquid crystal display to improve the quality of moving pictures.

According to an aspect of the present invention, there is provided an apparatus for driving a liquid crystal display, the apparatus including: a transition check unit that checks whether an input image signal between a first frame and a second frame has changed and whether an input image signal between the second frame and a third frame has changed; an overdrive control unit that overdrives the input image signal in the second frame in an upper direction or a lower direction based on the changed input image signal between the first and second frames; and an overdrive compensation unit that changes the input image signal in the third frame in an opposite direction to the overdrive direction if the input image signal between the second and third frames has not changed.

The overdrive control unit may overdrive the input image signal of the second frame so that an average response value of the overdriven image signal of the second frame during the second frame duration is approximated to a target response value of the input image signal of the second frame.

The overdrive control unit may have a lookup table that stores overdrive values for overdriving the input image signal of the second frame based on the amount of image signal changes between the input image signal of the first frame and the input image signal of the second frame.

The overdrive compensation unit may change the input image signal of the third frame so that an average response value during the third frame duration is approximated to a target response value of the input image signal of the third frame.

The overdrive compensation unit may include a lookup table that stores compensation values for compensating the input image signal of the third frame so that an average response value during the third frame duration is approximated to a target response value of the input image signal of the third frame.

The apparatus may further include a flag buffer that sets up and stores a first flag showing whether the input image signal between the first and second frames has changed and a second flag showing whether the input image signal between the second and the third frames has changed.

The apparatus may further include a data selection unit that selects and outputs one image signal selected from the group consisting of the input image signal, an image signal output from the overdrive control unit, and an image signal output from the overdrive compensation unit, based on a flag value output from the flag buffer.

According to another aspect of the present invention, there is provided a method for driving a liquid crystal display, the method including: checking if an input image signal between a first frame and a second frame has changed; overdriving the input image signal of the second frame to an upper direction or a lower direction based on the changed input image signal between the first and second frames; checking if an input image signal between the second frame and a third frame has changed; and changing the input image signal of the third frame in an opposite direction to the overdrive direction when the input image signal between the second and third frames has not changed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Hereinafter, the present invention will be described more fully with reference to the accompanying drawings, in which exemplary embodiments of the invention are shown.

Figure 1A:
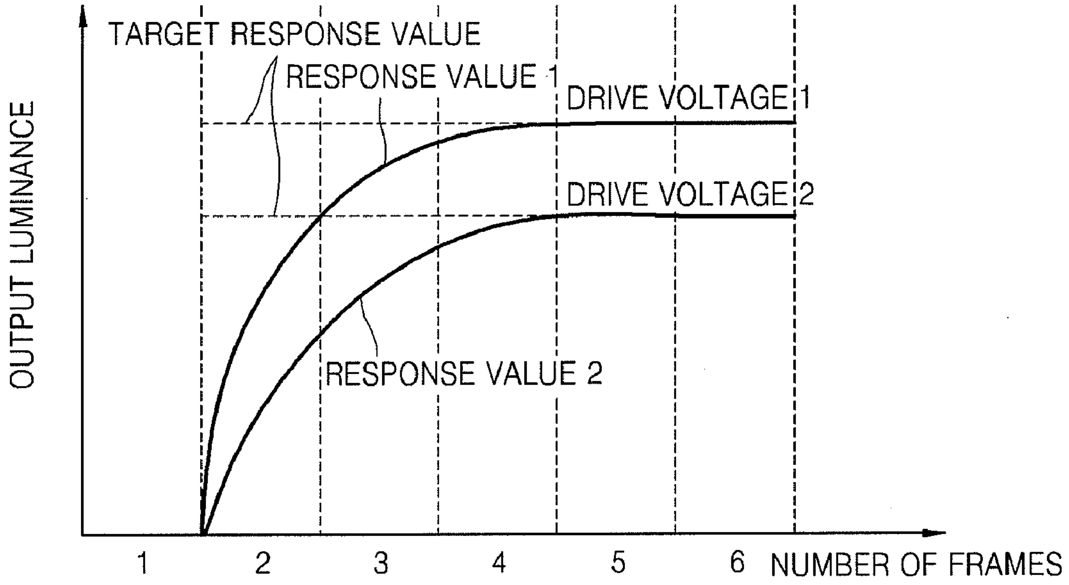
FIG. 1A (RELATED ART)
FIG. 1A is a graph illustrating response values with respect to different drive voltages in a related art LCD.
Figure 1B:
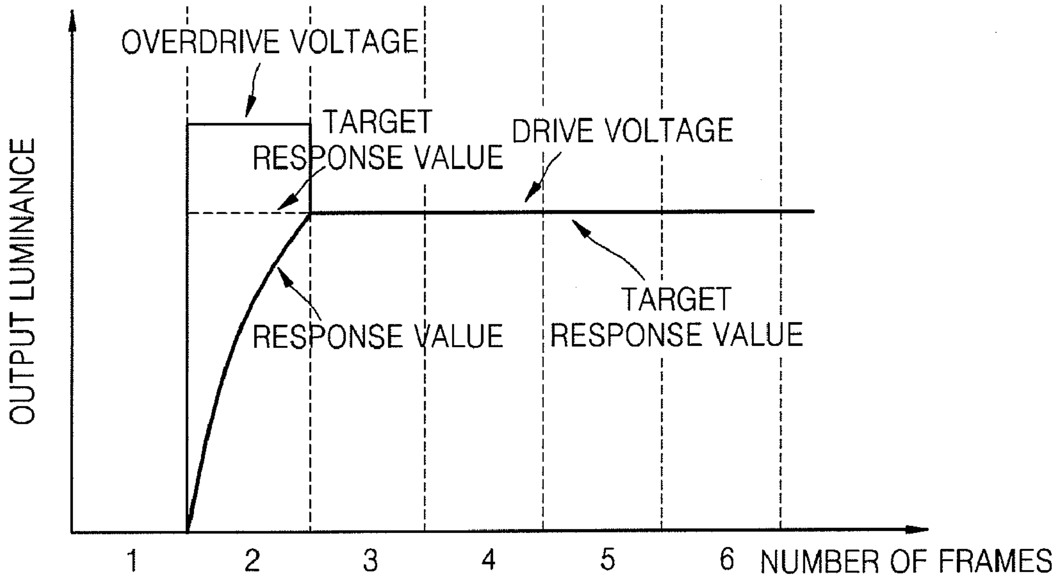
FIG. 1B (RELATED ART)
FIG. 1B is a graph illustrating response values with respect to an overdrive voltage in the related art LCD.
Figure 2:
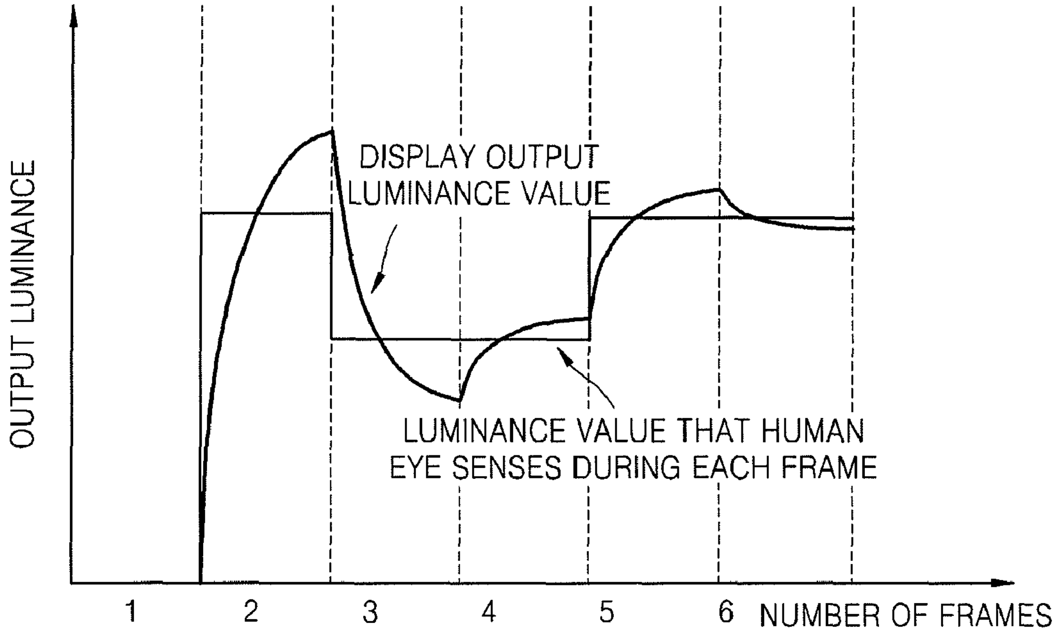
FIG. 2 is a graph illustrating a relationship between an actual display output luminance value and a luminance value sensed by the human eye.

FIG. 2 is a graph illustrating a relationship between an actual display output luminance value and a luminance value sensed by the human eye.

FIG. 2 illustrates a luminance value sensed by the human eye and an output luminance value of an LCD in each frame when a duration between frames is shorter than response time of the human eye. In FIG. 2, the luminance value sensed by the human eye is shown in each frame period.

Referring to FIG. 2, when the frame frequency is higher than the response speed of the human eye and when an output luminance value changes or fluctuates in an LCD, the human eye only senses an integrated luminance value. In other words, when the frame frequency is higher than the response speed of the human eye, the human eye recognizes an average response value between frames in a frame transition period, that is, an average luminance value.

Figure 3A:
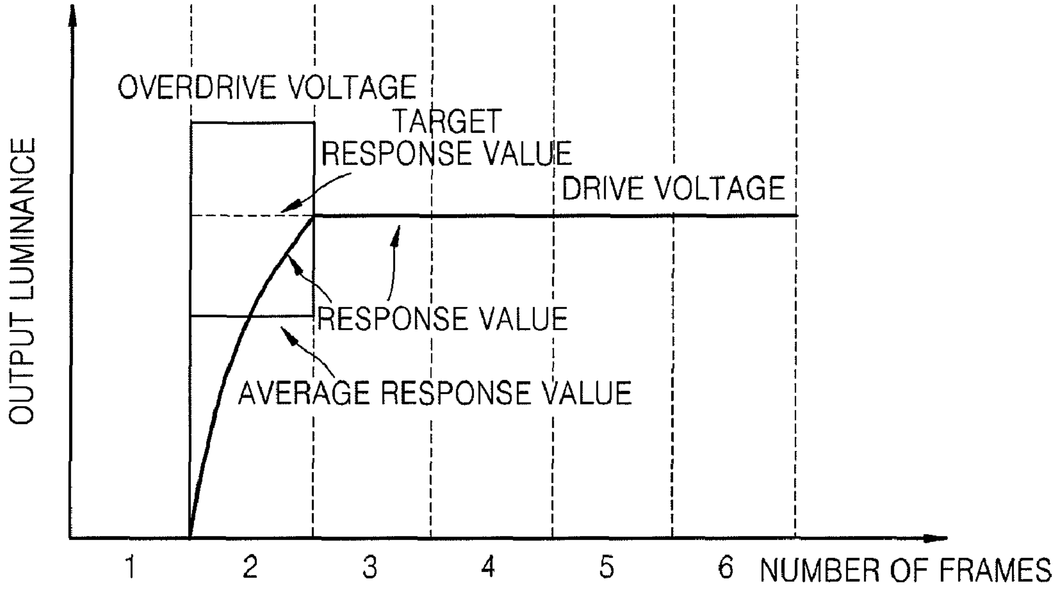
FIGS. 3A and 3B are graphs illustrating an average response value of LCD pixels when an overdrive voltage is applied to the LCD pixels.
Figure 3B:
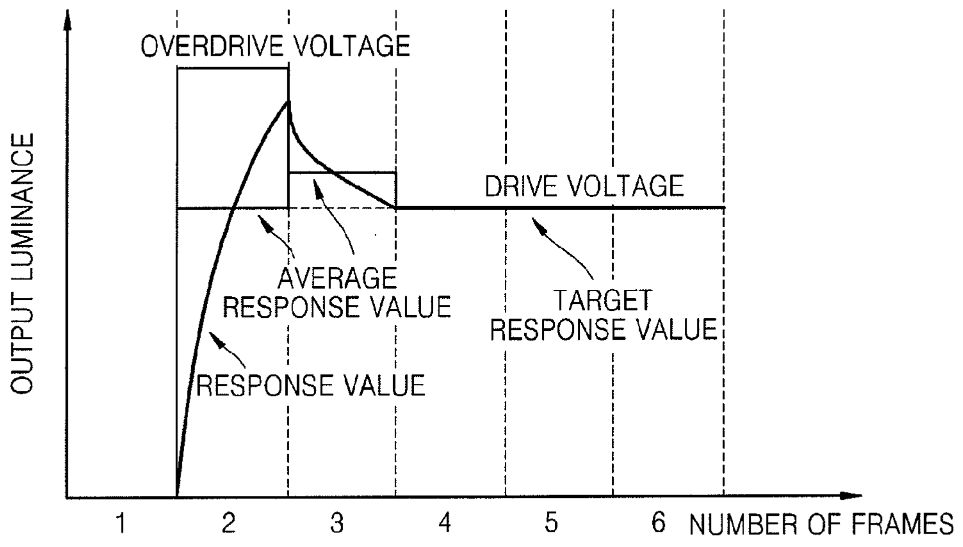

FIGS. 3A and 3B are graphs illustrating an average response value of LCD pixels when an overdrive voltage is applied to the LCD pixels.

In FIG. 3A, when an overdrive voltage is applied to the LCD pixels, the response speed of the LCD pixels is faster than the response speed of the LCD pixels when a normal drive voltage is applied to the LCD pixels. However, during frame 2, an average response value is lower than a target response value. Accordingly, an all edge-blur effect due to delay in the LCD response speed cannot be removed.

FIG. 3B illustrates the average response value of the LCD pixels when an overdrive voltage higher than the overdrive voltage applied in FIG. 3A is applied to the LCD pixels. In FIG. 3B, the response speed of the LCD pixels is faster than the response speed shown in FIG. 3A. Referring to FIG. 3B, an average response value is approximated to a target response value during frame 2. Accordingly, the human eye cannot sense the all edge-blur effect during the frame 2.

However, an average response value in frame 3 is higher than a target response value due to the overdrive for the image signal of frame 2. Accordingly, an inverse afterimage occurs in frame 3.

Figure 4:
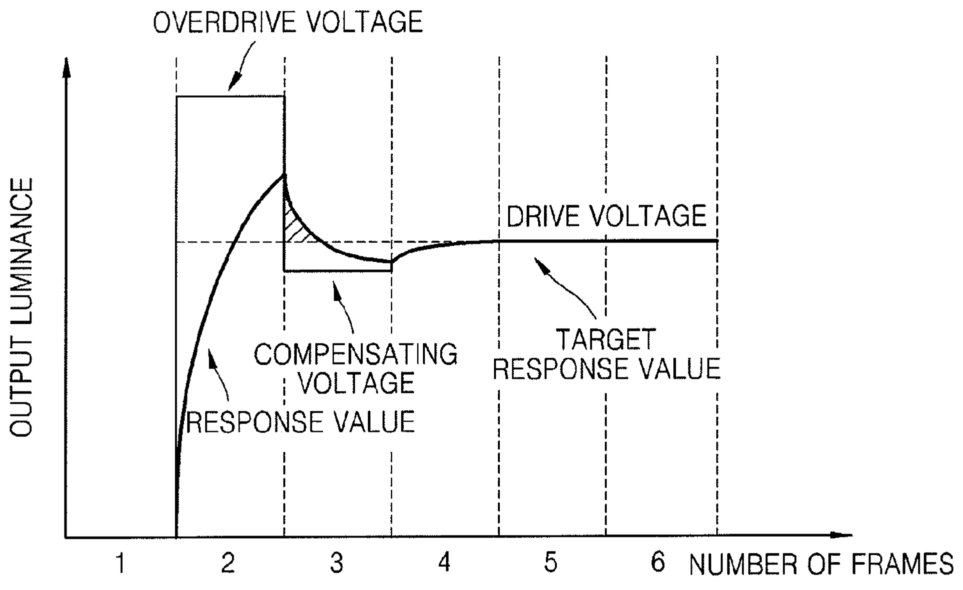
FIG. 4 is a graph illustrating a response value when an overdrive voltage and a compensating voltage according to an exemplary embodiment of the present invention are applied to LCD pixels.
Figure 5:
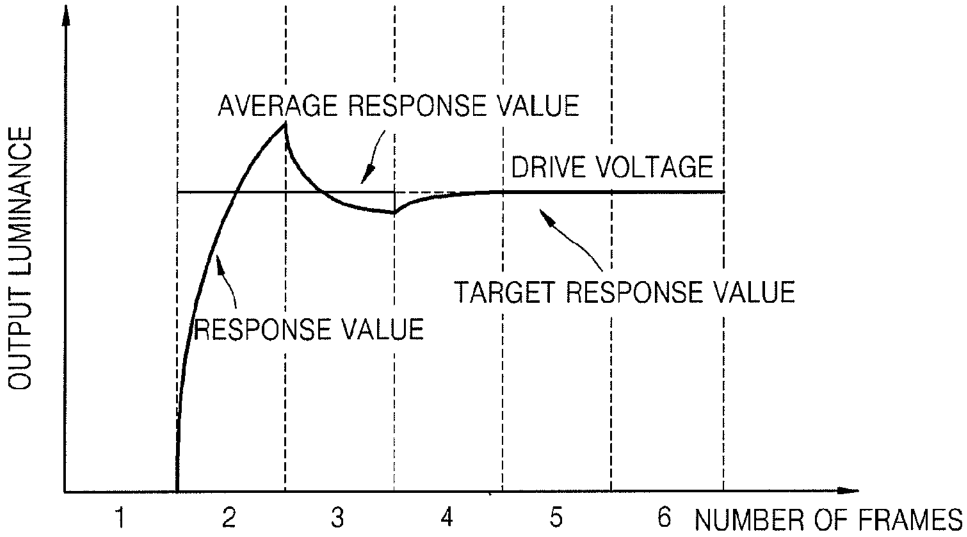
FIG. 5 is a graph illustrating an average response value of the response value shown in FIG. 4.

FIG. 4 is a graph illustrating a response value when an overdrive voltage and a compensating voltage according to an exemplary embodiment of the present invention are applied to LCD pixels. FIG. 5 is a graph illustrating an average response value of the response value shown in FIG. 4.

According to an exemplary embodiment of the present invention, if an input image signal changes, the changed input image signal is overdriven to quicken the response speed. That is, when the luminance of the input image signal is high, the input image signal is overdriven in an upper direction and when the luminance of the input image signal is low, the input image signal is overdriven in a lower direction. A drive voltage applied to the LCD also changes based on the changed input image signal.

In FIG. 4, the luminance value of the input image signal is high. Thus, an overdrive value corresponding to the changed input image signal sets up an integrated or average response value during a frame duration of the overdriven image signal to be the target response value in dotted line.

As shown in FIG. 3B, to remove an inverse afterimage occurred during a frame 3 duration due to overdrive in frame 2, a compensating voltage is applied to the LCD. Referring to FIG. 4, as the overdrive voltage increases, the size of a slash area having a higher response value than the target response value increases. Accordingly, the compensating voltage is determined by adding a value that is proportionate to the overdrive value in frame 2 and the input image signal of frame 3. On the other hand, the compensating voltage can be determined by adding a value that is proportionate to the difference between an input image signal of frame 3 and an image signal in overdriven frame 2, and the input image signal of frame 3.

Referring to FIG. 4, the compensating voltage is set up to be lower than the normal drive voltage for outputting a target response value in frame 3. Accordingly, a response curve in a period in frame 3 is lower than the normal drive voltage.

Referring to FIG. 5, by overdriving an input image signal of frame 2 during the duration of frame 2, and by compensating an input image signal of frame 3 during frame 3, an average response value between frames becomes approximately equal to a target response value. Accordingly, more edge-blur can be reduced compared to a related method which temporarily applies an overdrive voltage only.

On the other hand, after the compensating voltage is applied in frame 3, a response value curve after frame 3 follows the normal drive voltage.

Figure 6:
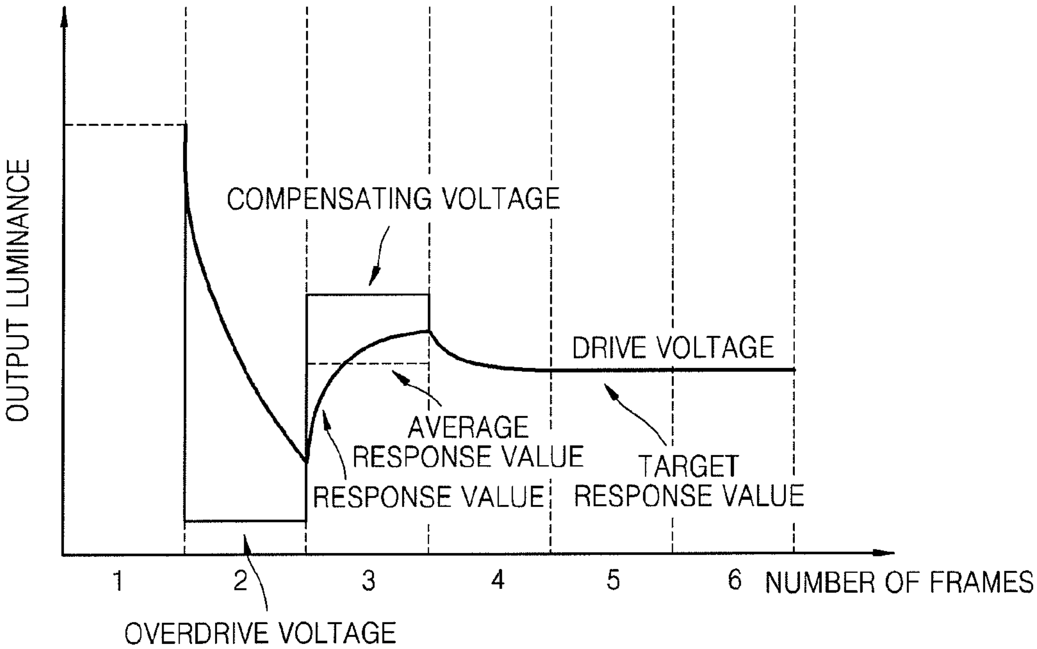
FIG. 6 is a graph illustrating a response value when an overdrive voltage and a compensating voltage according to another exemplary embodiment of the present invention are applied to LCD pixels.

FIG. 6 is a graph illustrating a response value when an overdrive voltage and a compensating voltage according to another exemplary embodiment of the present invention are applied to pixels.

In FIGS. 4 and 5, a method of driving a liquid crystal display when an output luminance value in frame pixels is high is described. In FIG. 6, a method of driving a liquid crystal display when an output luminance value in frame pixels is low is described.

When an output luminance value in frame 2 decreases compared to previous frames, an input image signal of frame 2 is overdriven in a lower direction. Then, to prevent an inverse afterimage caused by a lower average response value than a target response value in frame 3 due to overdrive, an input image signal of frame 3 is compensated in an upper direction.

When the overdrive voltage and the compensating voltage are sequentially applied to the LCD by overdriving the image signal and compensating the image signal input after the overdriven image signal in the opposite direction to the overdrive voltage, an average response value between frames becomes approximately equal to the target response value. Accordingly, the quality of moving pictures can be improved by quickening the response speed and by reducing the inverse afterimage.

Figure 7:
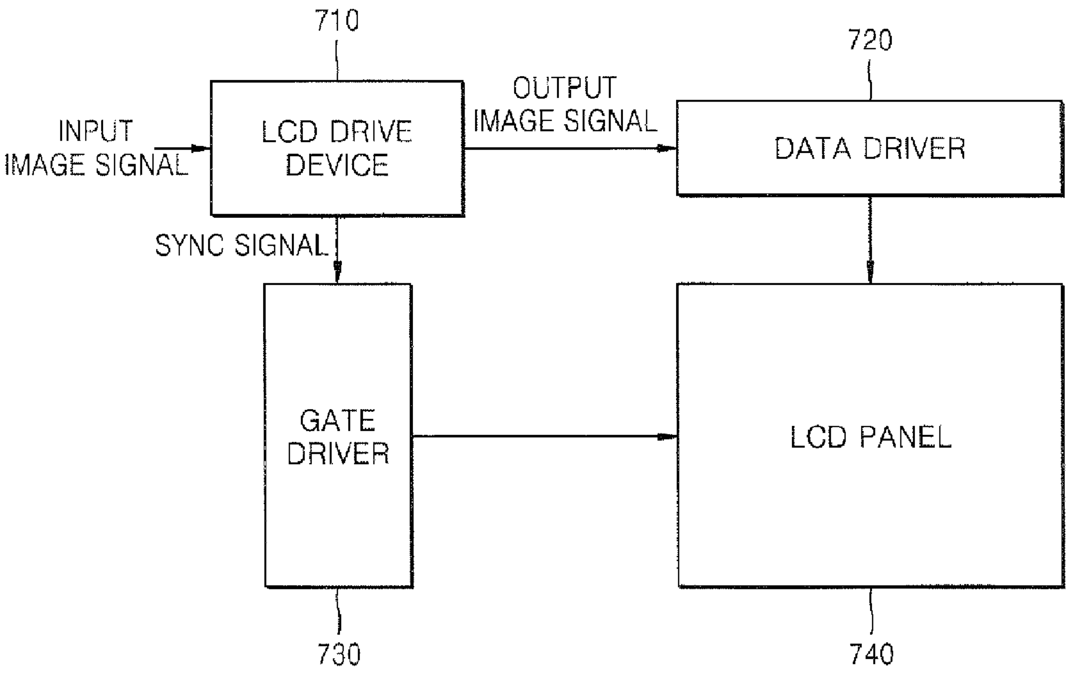
FIG. 7 is a diagram illustrating an LCD including a driving apparatus according to an exemplary embodiment of the present invention.

FIG. 7 is a diagram illustrating an LCD including a driving apparatus according to an exemplary embodiment of the present invention. The LCD according to the current exemplary embodiment of the present invention includes an LCD drive device 710, a data driver 720, a gate driver 730, and an LCD panel 740.

In FIG. 7, an input image is controlled by the LCD drive device 710. A voltage signal applied to pixels by the LCD drive device 710 is transferred to the data driver 720 and a video sync signal is applied to the gate driver 730. The data driver 720 changes an image signal output by the LCD drive device 710 to a corresponding data voltage in order to supply the changed image signal to the LCD panel 740.

To quicken the response speed of the LCD, the LCD drive device 710 overdrives an input image signal in an upper or a lower direction based on the change of the input image signal. Also, the LCD drive device 710 compensates an input image signal following the overdriven image signal to prevent an inverse afterimage caused by a difference in an average response value and a target response value due to the overdriven image signal during the following frame duration.

Figure 8:
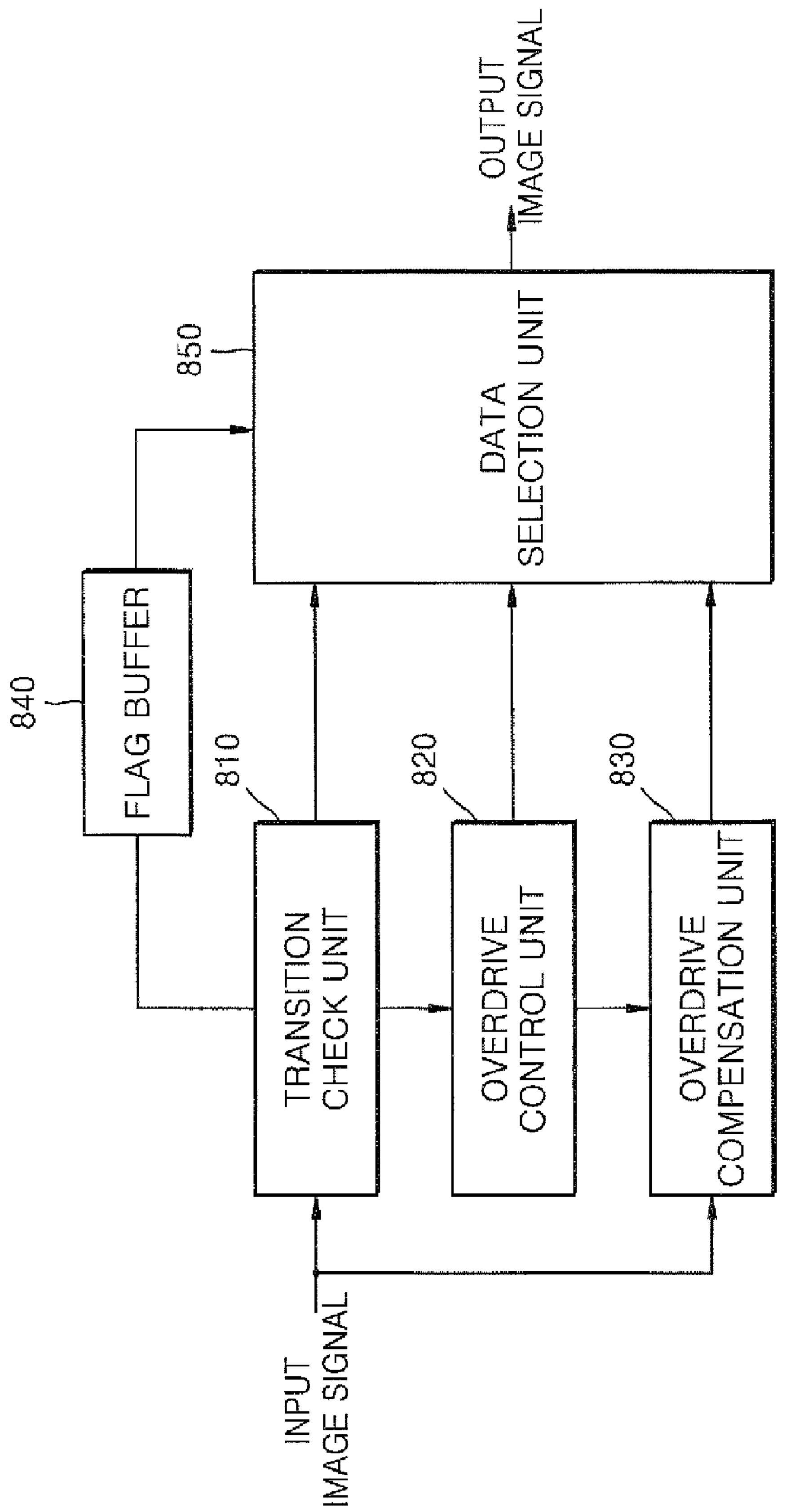
FIG. 8 is a block diagram of an apparatus for driving an LCD according to an exemplary embodiment of the present invention.

FIG. 8 is a block diagram of an apparatus for driving an LCD according to an exemplary embodiment of the present invention. The apparatus for driving the liquid crystal display according to the current exemplary embodiment of the present invention includes a transition check unit 810, an overdrive control unit 820, an overdrive compensation unit 830, a flag buffer 840, and a data selection unit 850. In FIG. 8, it is considered that a first frame, a second frame, and a third frame are input sequentially.

The transition check unit 810 checks whether an input image signal between the first and second frames changed and whether an input image signal between the second and third frames has changed. That is, the transition check unit 810 checks whether an input image signal of the second frame and an input image signal of the first frame are different and whether an input image signal of the third frame and an input image signal of the second frame are different. For example, referring to FIG. 4, the transition check unit 810 may check that the change of input image signals is between frame 1 and frame 2, and frame 2 and frame 3.

The overdrive control unit 820 overdrives an input image signal of the second frame in an upper or a lower direction if an input image signal between the first and second frames changes. That is, if a luminance value of an input image signal increases, the input image signal is overdriven in the upper direction, and if a luminance value of an input image signal decreases, the input image signal is overdriven in the lower direction. The overdrive control unit 820 overdrives an input image signal of the second frame so that an average response value of the overdriven image signal of the second frame during the second frame duration is approximated to a target response value of the input image signal of the second frame.

If an input image signal between the second frame and the third frame does not change, the overdrive compensation unit 830 compensates an input image signal of the third frame by changing the input image signal of the third frame in the opposite direction to the overdrive direction of the overdrive control unit 820 to prevent an inverse afterimage during the third frame duration caused by the overdriven image signal of the second frame. That is, as shown in FIG. 4, when an input image signal of the second frame (that is, frame 2) is overdriven in the upper direction, the overdrive Compensation unit 830 compensates an input image signal of the third frame (that is, frame 3) in the lower direction. Also, as shown in FIG. 6, when an input image signal of the second frame (that is, frame 2) is overdriven in the lower direction, the overdrive compensation unit 830 compensates an input image signal of the third frame (that is, frame 3) in the upper direction. The overdrive compensation unit 830 changes an input image signal of the third frame so that an average response value during the third frame duration is approximated to a target response value of the input image signal of the third frame.

The flag buffer 840 stores comparison results of all pixels of frames. The flag buffer 840 sets up and stores a first flag showing whether an input image signal between the first and second frames has changed, and a second flag showing whether an input image signal between the second and third frames has changed. For example, when the input image signal between the first and second frames does not change, the first flag may be set to be 0 and when the input image signal between the first and second frames changes, the first flag may be set to be 1. The setting of the first flag may be reversed and the second flag may be set in the similar method.

The data selection unit 850 outputs one image signal selected from the group consisting of an input image signal, an image signal output from the overdrive control unit 820, and an image signal output from the overdrive compensation unit 830 to the data driver 720 of FIG. 7 based on the flag value output from the flag buffer 840.

When the second flag is 1 regardless of the first flag, an input image signal the current frame, for example, an input image signal of the second frame, is different from the input image signal of the previous frame, for example, the first frame. Accordingly, an image input signal of the second frame is overdriven by the overdrive control unit 820 and is output by the data selection unit 850. When the first flag is 1 and the second flag is 0, for example, an input image signal between the first and second frames is changed and an input image signal between the second and third frames is not changed. Accordingly, the data selection unit 850 selects and outputs the compensated image signal of an input image signal of the third frame that is the same as the second frame output from the overdrive compensation unit 830. Also, when the first and second flags are 0, an input image signal is not changed. Accordingly, an input image signal of each frame is bypassed as if it is to be transmitted to and output by the data selection unit 850.

Figure 9:
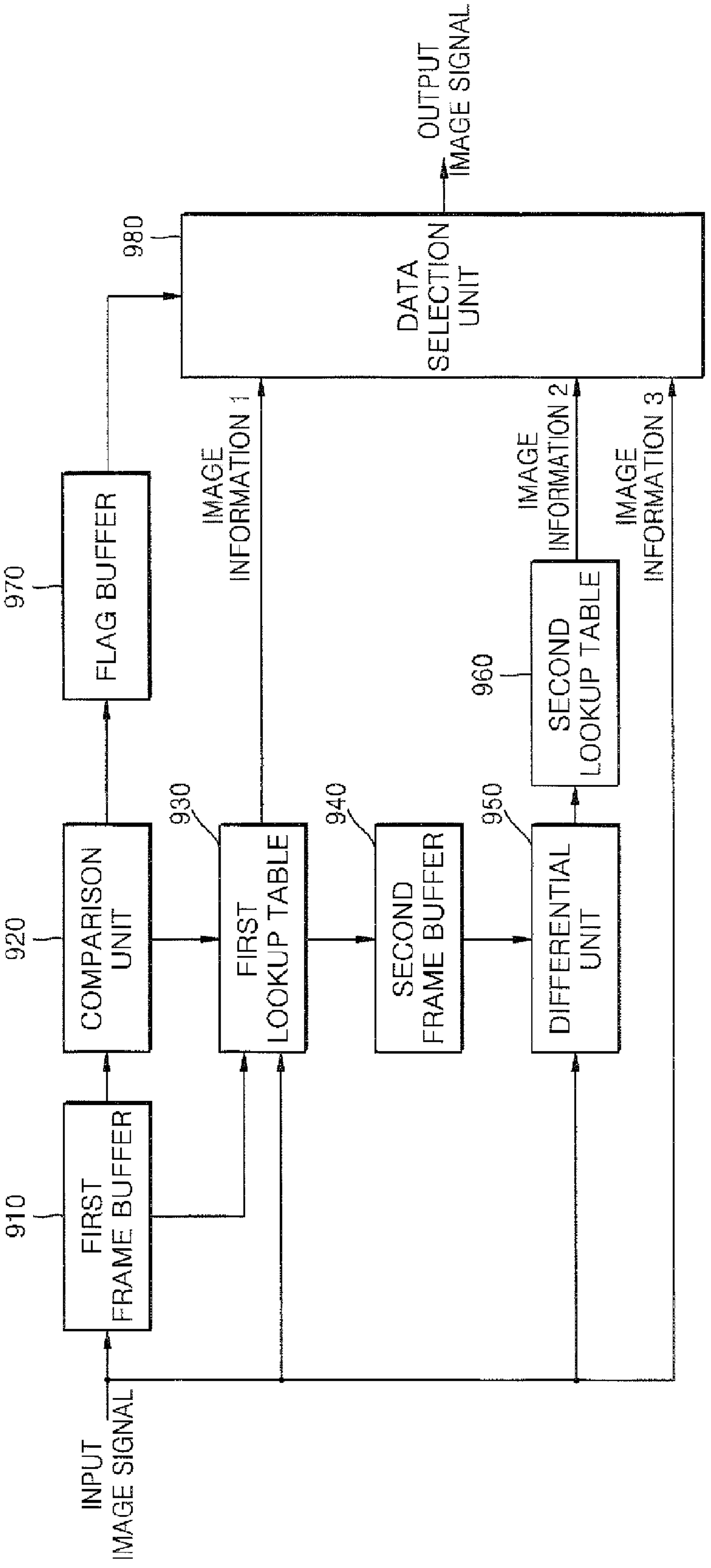
FIG. 9 is a detailed block diagram of the driving apparatus of FIG. 8.

FIG. 9 is a detailed block diagram of the apparatus for driving a liquid crystal display of FIG. 8. The apparatus of FIG. 9 includes a first frame buffer 910, a comparison unit 920, a first lookup table 930, a second frame buffer 940, a differential unit 950, a second lookup table 960, a flag buffer 970, and a data selection unit 980.

The first frame buffer 910 stores the previous frame. When a first frame, a second frame, and a third frame are input sequentially, the first frame is stored when the current frame is the second frame and the second frame is stored when the current frame is the third frame.

The comparison unit 920 compares an input image signal of the previous frame and an input image signal of the current frame by each corresponding pixel location. A flag showing comparison results of each corresponding pixel location is set and stored in the flag buffer 970. The flag buffer 970 performs the same as the flag buffer 840 of FIG. 8.

When an input image signal of the second frame becomes different from an input image signal of the first frame, the input image signal of the second frame is overdriven. At this time, the first lookup table 930, which stores an overdrive value for overdriving an input image signal of the second frame, may be used, based on the amount of image signal difference between input image signals of the first and second frames. Data stored in the first lookup table 930 is experimentally obtained to make an average response value during a transition period of an input image signal be similar to a target response value.

An overdrive level for overdriving an image signal of the second frame differs based on a transition level, which is a difference between an image signal of the first frame and an image signal of the second frame, and an image signal of the second frame. One pixel data level can be set to be a digital value from 0 to 255. Accordingly, the first lookup table 930, storing each of an input image signal of the second frame and an overdrive level based on the transition level, can have 255×255 numbers of output values of the overdrive level. The overdrive level can be determined experimentally. Also, the first lookup table 930 may store each overdrive level of R, G, and B, considering the instants of time when the response speeds for R, G, and B are different.

On the other hand, the size of the first lookup table 930 can be reduced using several methods. For example, data showing a number of overdrive levels can be sampled and data which is not sampled can be calculated using a mathematical formula.

The overdriven image signal of the second frame from the first lookup table 930 is output to the data selection unit 980. On the other hand, the overdriven image signal of the second frame is stored in the second frame buffer 940. The differential unit 950 calculates an output of the second frame buffer 940 and an image signal of the third frame which is the same as an image signal of the second frame.

The second lookup table 960 stores a compensation value for compensating an input image signal of the third frame, based on the overdriven image signal of the second frame and the input image signal of the third frame, so that an average response value during the third frame duration is approximated to a target response value of the input image signal of the third frame. That is, the overdrive compensation unit 830 of FIG. 8 includes the second lookup table 960 in order to change an input image signal of the third frame in the opposite direction to the overdrive direction.

In FIG. 9, image information 1 denotes a value of overdriven input image signal of the second frame and image information 2 denotes a value of a compensated input image signal of the third frame to reduce an inverse afterimage. Image information 3 denotes that an input image signal is output as is because the input image signal is not changed.

Figure 10:
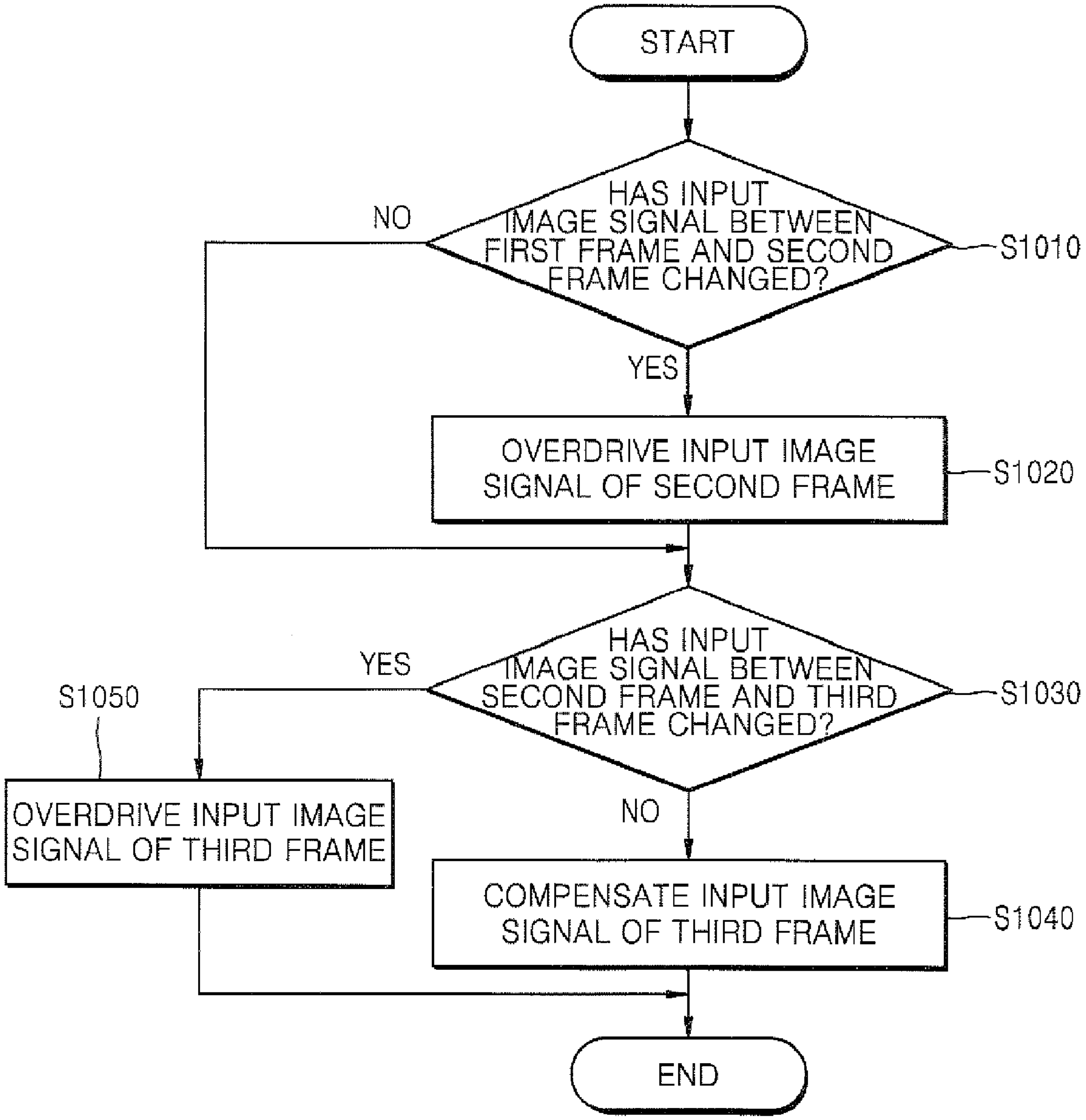
FIG. 10 is a flowchart illustrating a method for driving an LCD according to an exemplary embodiment of the present invention.

FIG. 10 is a flowchart illustrating a method for driving an LCD according to an exemplary embodiment of the present invention.

In operation S1010, it is determined whether an input image signal between a first frame and a second frames has changed. The input image signal is a signal input to pixels respectively located in a corresponding location of each frame.

In operation S1020, an input image signal of the second frame is overdriven in an upper or a lower direction based on the change of an input image signal between the first and second frames. At this time, the input image signal of the second frame can be overdriven so that an average response value during the second frame duration of the overdriven image signal of the second frame is approximated to a target response value of an image signal of the second frame. On the other hand, an image signal of the second frame can be overdriven using a lookup table storing an overdrive value for overdriving the input image signal of the second frame, based on the amount of change between the input image signal of the first frame and the input image signal of the second frame.

In operation S1030, it is determined whether an input image signal between the second and third frames has changed. If the input image signal between the second and third framed is not changed, an input image signal of the third frame is changed to an opposite direction to the overdrive direction in operation S1040 to reduce an inverse afterimage caused by the overdriven image signal of the second frame.

The input image signal of the third frame is changed so that an average response value of the third frame is approximated to a target response value of the input image signal of the third frame. Also, an input image signal of the third frame can be changed using a lookup table storing a compensation value for regulating an average response value during the third frame duration based on the overdriven image signal of the second frame and the input image signal of the third frame.

In operation S1050, the input image signal of the third frame is overdriven in order to quicken the response speed of the third frame if the input image signal of the third frame changes, thereby being different from the input image signal of the second frame. On the other hand, although not shown in FIG. 10, if an input image signals of each first, second, and third frames are not changed, the input image signals are output as they are.

The present invention can also be exemplarily embodied as computer readable codes on a computer readable recording medium. Functional programs, codes, and code segments which exemplarily embody the present invention are obvious to programmers in the related art. The computer readable recording medium is any data storage device that can store data which can be thereafter read by a computer system. Examples of the computer readable recording medium include read-only memory (ROM), random-access memory (RAM). The computer readable recording medium can also be distributed over network coupled computer systems so that the computer readable code is stored and executed in a distributed fashion.

As described above, an image signal is overdriven so that an average response value between frames is approximated to a target response value of the input image signal in order to quicken the response speed of an LCD. Also, when a following image signal input after the overdriven image signal has not changed, the following image signal can be compensated to reduce an inverse afterimage caused by the overdrive and to improve the quality of moving pictures.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for driving a liquid crystal display, the apparatus comprising:

a transition check unit which determines whether there has been a change between an input image signal of a first frame, and an input image signal of a second frame and whether there has been a change between the input image signal of the second frame and an input image signal of a third frame;

an overdrive control unit which overdrives the input image signal of the second frame in an overdrive direction when the transition check unit determines that there has been a change between the input image signal of the first frame and the input image signal of the second frame, wherein the overdrive direction is the same as a changed direction of the input image signals of the first frame and the second frame;

an overdrive compensation unit which changes the input image signal of the third frame in an opposite direction to the overdrive direction when the transition check unit determines that there has not been a change between the input images of the second and third frames; and a data selection unit which outputs one of an input image signal, the input image signal which is overdriven in the overdrive control unit, and the input image signal which is changed in the opposite direction to the overdrive direction in the overdrive compensation unit according to the determination in the transition check unit;

wherein the data selection unit outputs the input image signal which is overdriven in the overdrive control unit when the transition check unit determines that there has been a change between the input image signals of the first and second frames, and outputs the input image signal which is changed in the opposite direction to the overdrive direction in the overdrive compensation unit when the transition check unit determines that there has not been a change between the input image signals of the second and third frames.

2. The apparatus of claim 1, wherein the overdrive control unit overdrives the input image signal of the second frame so that an average response value of the overdriven image signal of the second frame during a second frame duration is approximated to a target response value of the input image signal of the second frame.

3. The apparatus of claim 1, wherein the overdrive control unit refers to a lookup table which stores overdrive values for overdriving the input image signal of the second frame based on an amount of image signal changes between the input image signal of the first frame and the input image signal of the second frame.

4. The apparatus of claim 1, wherein the overdrive compensation unit changes the input image signal of the third frame so that an average response value during a third frame duration is approximated to a target response value of the input image signal of the third frame.

5. The apparatus of claim 1, wherein the overdrive compensation unit refers to a lookup table which stores compensation values for compensating the input image signal of the third frame so that an average response value during a third frame duration is approximated to a target response value of the input image signal of the third frame.

6. The apparatus of claim 1, further comprising a flag buffer which sets and stores a first flag showing when the transition check unit determines that there has been a change between the input image signals of the first and second frames and a second flag showing when the transition check unit determines that there has been a change between the input image signals of the second and the third frames.

7. The apparatus of claim 6, wherein the data selection unit selects and outputs one of the input image signal of each of the first and second frames, an image signal output from the overdrive control unit, and an image signal output from the overdrive compensation unit, based on a flag value output from the flag buffer.

8. A method of driving a liquid crystal display, the method comprising:

determining, by a transition check unit, whether there has been a change between an input image signal of a first frame and an input image signal of a second frame;

overdriving the input image signal of the second frame in an overdrive direction when it is determined that there has been a change between the input image signals of the first and second frames, wherein the over direction is the same as a changed direction of the input image signals of the input image signals of the first and second frames;

determining whether there has been a change between a the input image signal of the second frame and an input image signal of a third frame;

changing the input image signal of the third frame in an opposite direction to the overdrive direction when it is determined that there has not been a change between the input image signals of the second and third frames; and selectively outputting, by a data selection unit, one of an input image signal, the input image signal which is overdriven in the overdrive direction, and the input image signal which is changed in the opposite direction to the overdrive direction according to the determination whether there has been a change between the input image signals of the first and second frames and whether there has been a change between the input image signals of the second and third frames, wherein the input image signal which is overdriven in the overdrive direction is output when there has been a change between the input image signals of the first and second frames, and the input image signals which is changed in the opposite direction to the overdrive direction is output when there has not been a change between the input image signals of the second and third frames.

9. The method of claim 8, wherein the overdriving of the input image signal of the second frame in the overdrive direction comprises overdriving the input image signal of the second frame so that an average response value of the overdriven image signal of the second frame during a second frame duration is approximated to a target response value of the input image signal of the second frame.

10. The method of claim 8, wherein the overdriving of the input image signal of the second frame in the overdrive direction comprises overdriving the input image signal of the second frame using a lookup table which stores overdrive values for overdriving the input image signal of the second frame based on the amount of image signal changes between the input image signal of the first frame and the input image signal of the second frame.

11. The method of claim 8, wherein the changing of the input image signal of the third frame comprises changing the input image signal of the third frame so that an average response value of the third frame is approximated to a target response value of the input image signal of the third frame.

12. The method of claim 8, wherein the changing of the input image signal of the third frame comprises changing the input image signal of the third frame using a lookup table which stores compensation values for compensating the input image signal of the third frame so that an average response value during the third frame duration is approximated to a target response value of the input image signal of the third frame.

13. A non-transitory computer readable recording medium having recorded thereon a program for performing a method comprising:

determining, by a transition check unit, whether there has been a change between an input image signal of a first frame and an input image signal of a second frame;

overdriving the input image signal of the second frame in an overdrive direction when it is determined that there has been a change between the input image signals of the first and second frames, wherein the overdrive direction is the same as a changed direction of the input image signals of the first and second frames;

determining whether there has been a change between the input image signal of the second frame and an input image signal of a third frame;

changing the input image signal of the third frame in an opposite direction to the overdrive direction when it is determined that there has not been a change between the input image signals of the second and third frames; and selectively outputting, by a data selection unit, one of an input image signal, the input image signal which is overdriven in the overdrive direction, and the input image signal which is changed in the opposite direction to the overdrive direction according to the determination whether there has been a change between the input image signals of the first and second frames, and whether there has been a change between the input image signals of the second and third frames, wherein the input image signal which is overdriven in the overdrive direction is output when there has been a change between the input image signals of the first and second frames, and the input image signal which is changed in the opposite direction to the overdrive direction is output when there has not been a change between the input image signals of the second and third frames.

* * * * *